United States Patent
Jensen

(10) Patent No.: US 7,651,063 B2
(45) Date of Patent: Jan. 26, 2010

(54) SUCTION CUP DEVICE

(75) Inventor: Bradford Brian Jensen, St. Joseph, MI (US)

(73) Assignee: The Lamson & Sessions Co., Cleveland, OH (US)

(*) Notice: Subject to any disclaimer, the term of this patent is extended or adjusted under 35 U.S.C. 154(b) by 235 days.

(21) Appl. No.: 11/446,928

(22) Filed: Jun. 5, 2006

(65) Prior Publication Data
US 2007/0221801 A1 Sep. 27, 2007

Related U.S. Application Data

(60) Provisional application No. 60/786,313, filed on Mar. 27, 2006.

(51) Int. Cl.
*F16B 47/00* (2006.01)
(52) U.S. Cl. ............. 248/206.2; 248/205.5; 248/316.7; 248/909
(58) Field of Classification Search ............. 248/206.2, 248/205.8, 205.5, 27.8, 229.26, 231.81, 227.4, 248/228.7, 230.7, 909, 316.7, 224.61, 223.41, 248/224.51
See application file for complete search history.

(56) References Cited

U.S. PATENT DOCUMENTS

| | | | | |
|---|---|---|---|---|
| 375,133 | A * | 12/1887 | Creque | 248/159 |
| 1,839,694 | A * | 1/1932 | Nelson et. al. | 248/205.5 |
| 2,051,847 | A * | 8/1936 | Halstead | 248/206.4 |
| 2,055,397 | A | 9/1936 | Zaiger | |
| 2,221,238 | A * | 11/1940 | Lloyd | 248/205.5 |
| 2,663,530 | A * | 12/1953 | Nye | 248/205.5 |
| 2,919,877 | A * | 1/1960 | Gallagher | 248/125.3 |
| 3,094,892 | A * | 6/1963 | Topf | 411/42 |
| 3,384,987 | A * | 5/1968 | Prechtl | 40/757 |
| 3,708,093 | A | 1/1973 | Toms | |
| 5,028,026 | A | 7/1991 | Philipps et al. | |
| 5,039,045 | A | 8/1991 | Adams et al. | |
| 5,110,078 | A | 5/1992 | Gary | |
| D332,390 | S | 1/1993 | Adams | |
| D345,903 | S | 4/1994 | Adams et al. | |
| 5,422,803 | A * | 6/1995 | Kilgore | 362/392 |
| 5,595,364 | A | 1/1997 | Protz | |
| 5,624,091 | A * | 4/1997 | Protz, Jr. | 248/205.5 |
| D393,098 | S | 3/1998 | Adams | |
| 5,845,882 | A * | 12/1998 | Hodges et al. | 248/59 |
| 5,964,437 | A * | 10/1999 | Belokin et al. | 248/205.5 |
| D423,329 | S | 4/2000 | Adams | |
| 6,053,464 | A | 4/2000 | Cardarelli | |
| 6,143,391 | A * | 11/2000 | Barnes et al. | 428/99 |
| 6,234,435 | B1 * | 5/2001 | Yeh | 248/205.5 |
| 6,244,778 | B1 | 6/2001 | Chesbrough | |

(Continued)

FOREIGN PATENT DOCUMENTS

DE 10107780 9/2002

(Continued)

*Primary Examiner*—Anita M King
(74) *Attorney, Agent, or Firm*—Jones Day

(57) ABSTRACT

A suction cup located on an axis has axially opposite front and rear ends. The front end is configured to adhere to a window pane by suction. A post extends along the axis rearward from the rear end and has axially spaced grooves. A bracket is configured to be mounted in any one of the grooves and to hold an item a set distance rearward from the post.

3 Claims, 4 Drawing Sheets

U.S. PATENT DOCUMENTS

| | | | |
|---|---|---|---|
| D447,012 S * | 8/2001 | Owens et al. | D7/620 |
| 6,622,978 B1 * | 9/2003 | Ghiz | 248/110 |
| 7,226,026 B2 * | 6/2007 | Lin | 248/205.5 |
| 2005/0109899 A1 | 5/2005 | Yeh | |

FOREIGN PATENT DOCUMENTS

| | | |
|---|---|---|
| DE | 10107780 A1 * | 9/2002 |
| GB | 2410294 | 7/2005 |
| WO | 0176411 | 10/2001 |

* cited by examiner

SUCTION CUP DEVICE

CROSS-REFERENCE TO RELATED APPLICATION

This application claims the benefit of U.S. Provisional Application No. 60/786,313, filed Mar. 27, 2006.

TECHNICAL FIELD

This application relates to suction cups devices.

BACKGROUND

A suction cup device includes a suction cup adhering by suction to a window pane. A bracket, attached to the suction cup, can grasp an item such as a candle.

SUMMARY

A suction cup located on an axis has axially opposite front and rear ends. The front end is configured to adhere to a window pane by suction. A post extends along the axis rearward from the rear end and has axially spaced grooves. A bracket is configured to be mounted in any one of the grooves and to hold an item a set distance rearward from the post.

Preferably, the post has an additional groove located such that when the bracket is mounted in the additional groove, the post would block the item held by the bracket from extending transversely across the axis unless the post is shortened. The post has a break-off notch for the shortening to be achieved by breaking the post at the notch. The notch is axially between two of the grooves. The bracket is configured to engage the item above the post when the post extends horizontally. The bracket can be swiveled fully about the post to bring the bracket into a desired orientation.

DESCRIPTION

Figure 1:
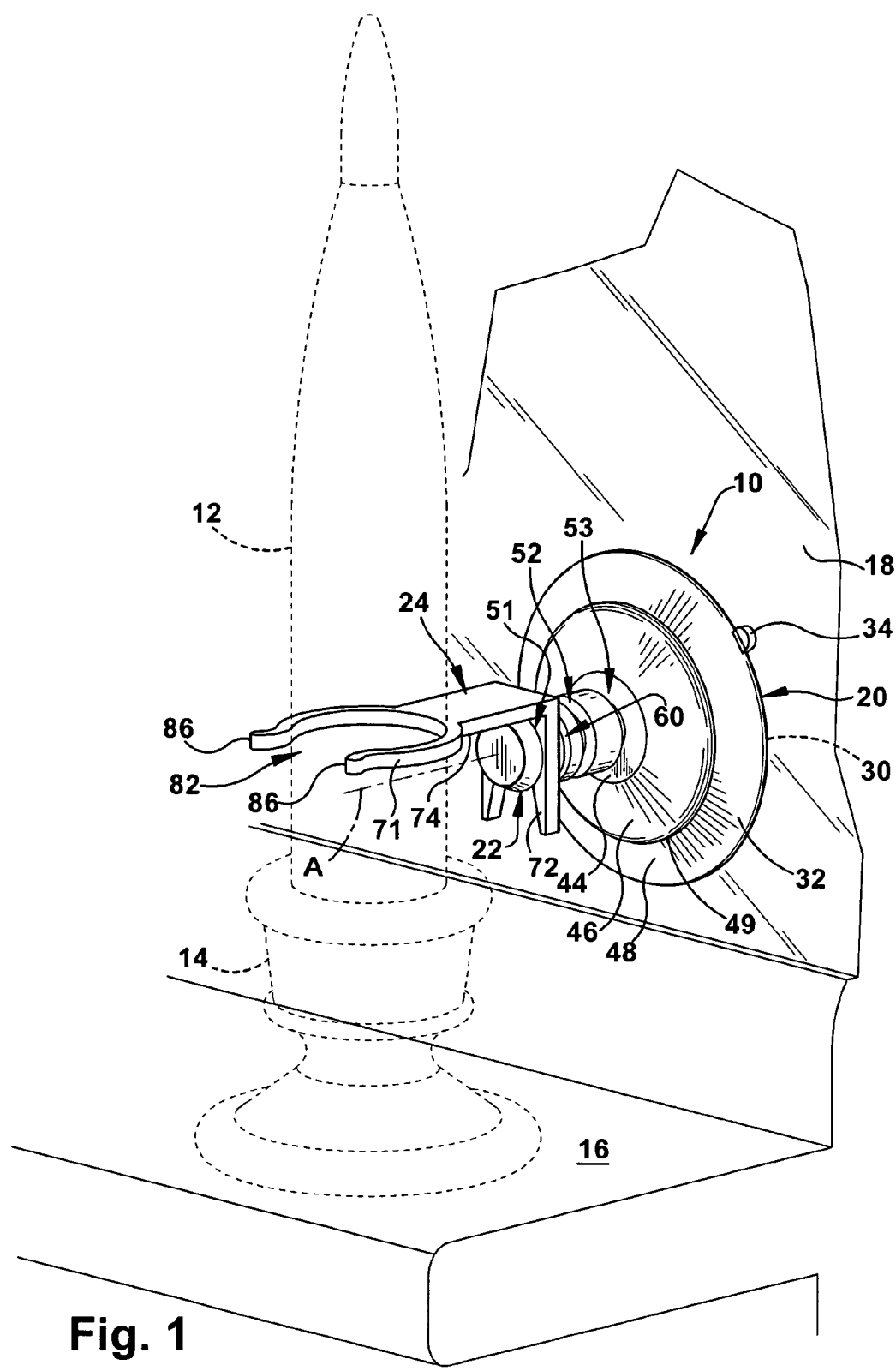
FIGS. 1-3 are perspective views of a suction cup device, shown in three configurations, securing a candle to a window pane.
Figure 2:
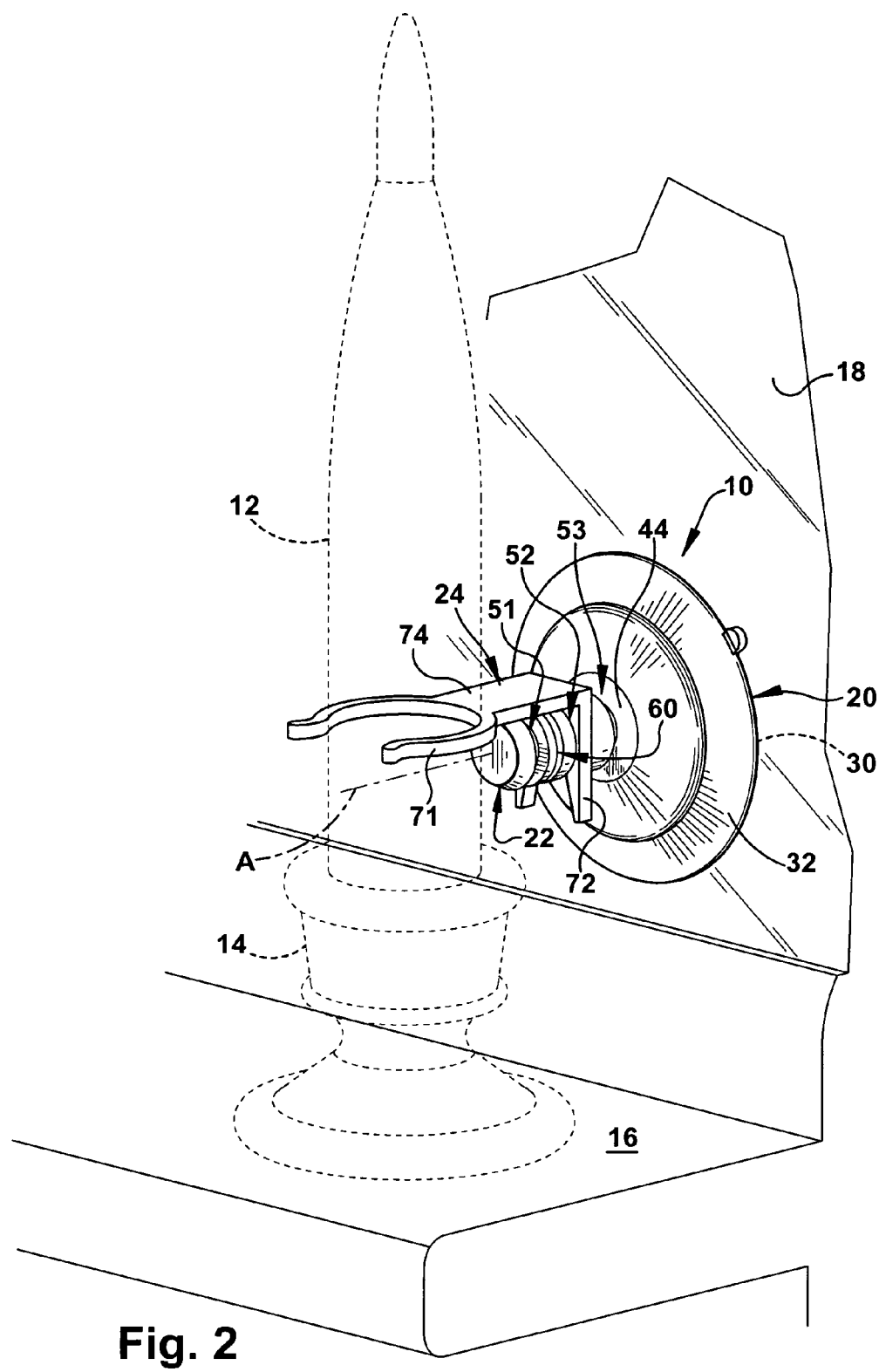
Figure 3:
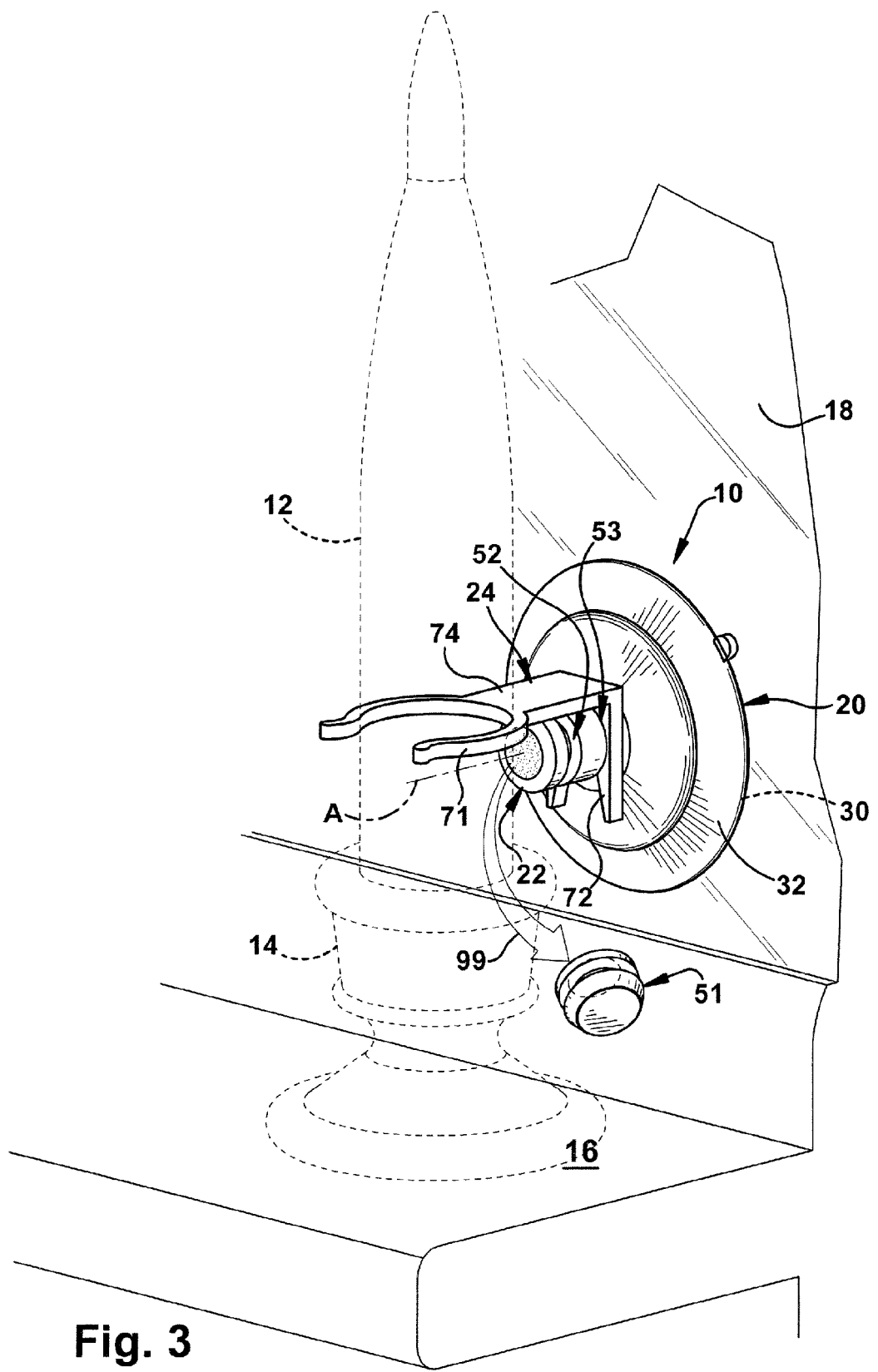

The apparatus shown in FIGS. 1-3 has parts that are examples of the elements recited in the claims. The apparatus thus includes examples of how a person of ordinary skill in the art can make and use the claimed invention. It is described here to meet the requirements of enablement and best mode without imposing limitations that are not recited in the claims.

The apparatus includes a suction cup device 10 that secures an artificial candle 12. The candle 12 is mounted in a candle holder 14 resting on a window sill 16 in front of a window pane 18. The device 10 holds the candle 12 a set distance from the pane 18. The distance is adjustable as illustrated by comparison of FIGS. 1-3 to each other.

The device 10 includes a suction cup 20, a post 22 and a bracket 24. The cup 20 is molded from elastic material. It is centered on an axis A and has axially opposite front and rear ends 30 and 32. The front end 30 is configured to be pressed against and adhere to the pane 18.

Figure 4:
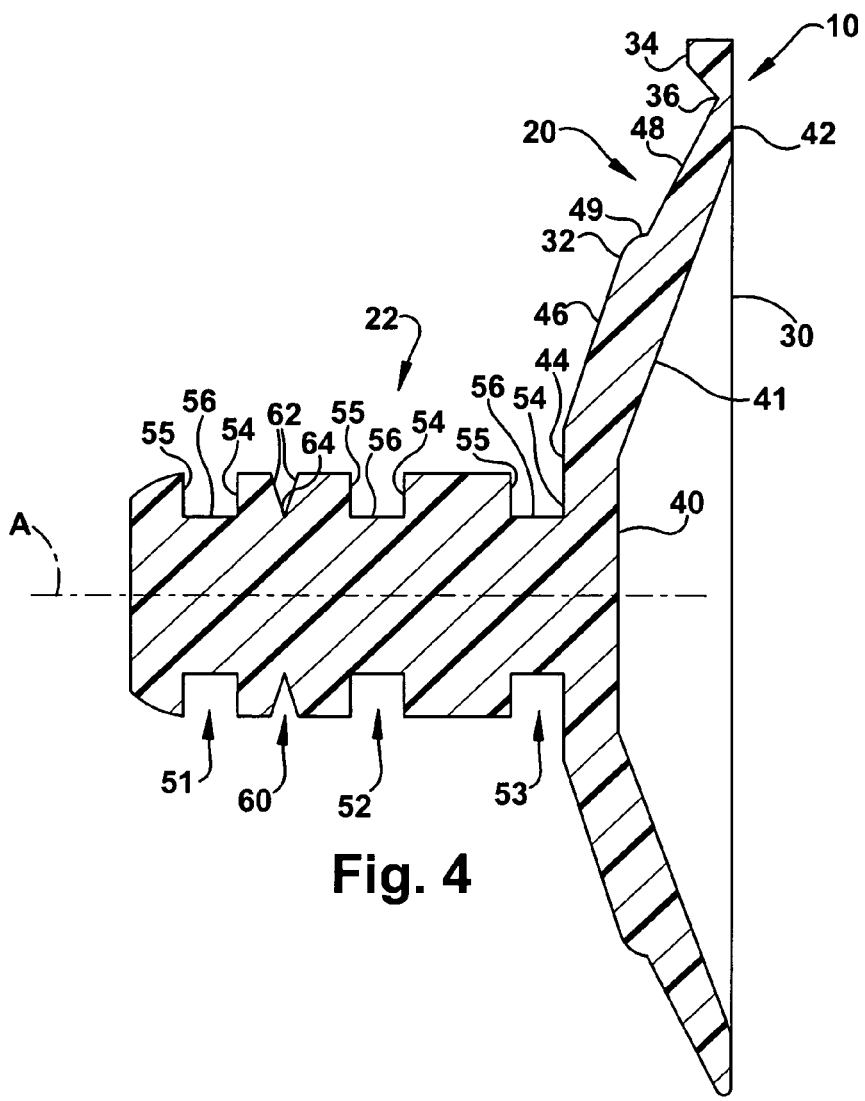
FIG. 4 is a sectional view of a suction cup and post of the device.

FIG. 4 shows the cup 20 in its natural, i.e., unflexed, state. It has a release tab 34 connected to a peripheral edge of the suction cup 20 by a living hinge 36. The tab 34 can be manually pulled rearward to release the suction to loosen the suction cup 20 from the pane 18.

The front end 30 of the cup 20 has three surfaces: a circular planar radially-inner surface 40, a frustoconical middle surface 41, and an annular planar radially-outer surface 42. The rear end 32 of the cup 20 has an annular planar radially-inner surface 44. It also has frustoconical middle and radially-outer surfaces 46 and 48, separated from each other by a shoulder surface 49. The cup 20 is relatively thinner and thus more flexible under the radially-outer surface 48. It is relatively thicker and thus more rigid under the middle surface 46.

The suction cup 20 is molded as a one-piece structure with the post 22. The post 22 is centered on the axis A and has first, second and third annular grooves 51, 52 and 53 evenly axially spaced apart. Each groove 51-53 extends circumferentially about the post 22 and has a rectangular profile when viewed from the side as in FIG. 4. The rectangular profile is defined by annular mutually-parallel axially-opposing proximal and distal side surfaces 54 and 55 and a cylindrical base surface 56. The proximal side surface 54 of the third groove 53 coincides with the planar radially-inner surface 44.

The post 22 further has an annular break-off notch 60 between the first and second grooves 51 and 52. The notch 60 has two axially-opposing frustoconical side surfaces 62 that meet at an annular line 64. In the side profile shown in FIG. 4, this appears as a wedge, with two lines 62 meeting at a corner 64 at an angle of approximately 35°. A user can break the post 22 by flexing it about the notch corner 64 (arrow 99 in FIG. 3), or by cutting it with a knife or scissors using the notch 60 as a guide. This can be indicated to a user by instruction literature sold with the device 10 or by indicia located on the device 10 itself.

Figure 5:
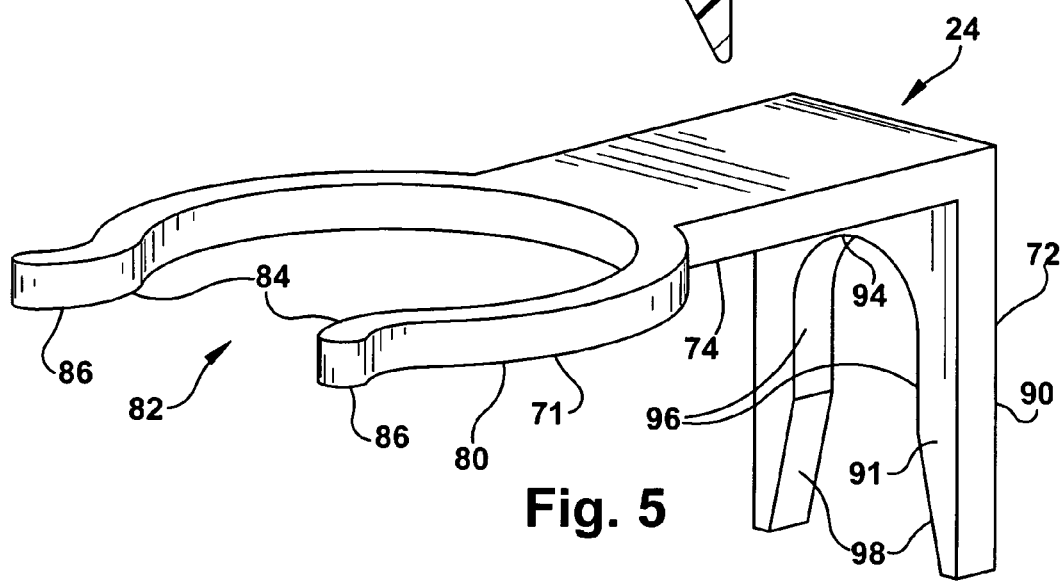
FIG. 5 is a perspective view of a bracket of the device.

The bracket 24 is shown in FIG. 5. It is a rigid one-piece molded structure including a holding clip 71 and a mounting clip 72 connected by a plate 74. The holding clip 71 is coplanar with the plate 74. It has a C-shaped section 80 configured to snugly grasp the candle 12. A gap 82 between two opposite ends 84 of the section 80 is narrower than the diameter of the candle 12. Two guide prongs 86 diverge horizontally outward from the two opposite ends 84. They guide the candle 12 (FIG. 1) into the clip 71. They also slide against the candle 12 to spread out the holding clip 71 to widen the gap 82 to let the candle 12 into the clip 71.

The mounting clip 72 includes front and rear surfaces 90 and 91 and an inverted U-shaped opening defined by a semi-cylindrical upper surface 94 and two opposing parallel side surfaces 96. The front, rear and upper surfaces 90, 91 and 94 define a rectangular profile that mates with the rectangular profile of the grooves 51, 52 and 53. Two guide surfaces 98 diverge radially outward from respective bottom ends of the parallel side surfaces 96. The mounting clip 72 can be mounted, without flexing, into any one of the grooves 51, 52 and 53 of the post 22 as shown in FIGS. 1-3. The mounting clip's guide surfaces 98 guide the clip 72 into the respective groove 51, 52 or 53.

In each of the mounted configurations shown in FIGS. 1-3, the mounting clip's two side surfaces 90 and 91 (FIG. 5) engage the respective groove's two side surfaces 54 and 55 (FIG. 4) to prevent axial movement of the clip relative to the post 22. The mounting clip's entire semicylindrical surface 94 engages the base surface 56 of the groove 51, 52 or 53, and the plate 74 rests on the post 22. The holding clip 71 is located above the post 22. It engages the candle 12 at a location above the post 22 to hold the candle 12 a set distance rearward from the pane 18 and a set distance rearward from the post 22. The distance is based on which groove 51, 52 or 53 the bracket 24 is mounted in.

Since the post 22 is symmetric, and even circularly symmetric, about its axis A, it has no required or preferred circumferential orientation. So a user can adhere the suction cup 20 to the window 18 without regard to circumferential orientation, and later swivel the bracket 24 about the post 22, even fully about the post, to bring the holding clip 71 into proper orientation for holding the vertically extending candle 12.

When the mounting clip 72 is inserted in the first or second groove 51 or 52 (FIG. 1 or 2), the holding clip 71 holds the candle 12 at a set distance rearward from the post 22. The candle 12 extends transversely across the axis A.

In contrast, when the mounting clip 72 is inserted in the third groove 53 as in FIG. 3, the end of the post 22 would underlie the holding clip 71 and block the candle 12 from extending transversely across the post 22. To prevent this, the post 22 is shortened by breaking the post 22 at its notch 60 as explained above and illustrated by arrow 99. The end of the post 22 that is broken off includes the first groove 51, which is not used in this configuration.

By mounting the bracket in different grooves 51-53, the device 10 can be adapted to position the holder 14 to rest squarely on sills of windows that differ in its sill's depth and distance from the pane. Alternatively, the device 10 can position the holder 14 for only a portion of its base to rest on the sill. Or, the device 10 can suspend the candle 12 in the air without support from a sill.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
    a suction cup located on an axis and having axially opposite front and rear ends, the front end configured to adhere to a window pane by suction;
    a post extending along the axis rearward from the rear end and having axially spaced grooves; and
    a bracket configured to be mounted in any one of the grooves and to hold an item a set distance rearward from the post;
    wherein the post has an additional groove located such that when the bracket is mounted in the additional groove, the post would block the item held by the bracket from extending transversely across the axis unless the post is shortened.

2. The apparatus of claim 1 wherein the post has a break-off notch for the shortening to be achieved by breaking the post at the notch.

3. The apparatus of claim 2 wherein the notch is axially between two of the grooves.

* * * * *